United States Patent [19]

Lefebvre et al.

[11] Patent Number: 4,873,666

[45] Date of Patent: * Oct. 10, 1989

[54] MESSAGE FIFO BUFFER CONTROLLER

[75] Inventors: Martin C. Lefebvre, Ottawa; Carmine A. Ciancibello; Youssef A. Geadah, both of Nepean, all of Canada

[73] Assignee: Northern Telecom Limited, Montreal, Canada

[*] Notice: The portion of the term of this patent subsequent to Oct. 10, 2006 has been disclaimed.

[21] Appl. No.: 108,655

[22] Filed: Oct. 15, 1987

[51] Int. Cl.[4] .......................... G11C 7/00; G11C 8/00
[52] U.S. Cl. .............................. 365/189.07; 365/221; 365/230.02; 365/236
[58] Field of Search ............... 365/189, 221, 236, 239, 365/78, 230; 340/750, 799, 802, 800; 364/200 MS File, 900 MS File

[56] References Cited

U.S. PATENT DOCUMENTS

| 3,601,809 | 8/1971 | Gray et al. | 364/200 |
|---|---|---|---|
| 4,163,291 | 7/1979 | Suzuki et al. | 365/221 |
| 4,171,538 | 10/1979 | Sheller | 364/900 |
| 4,220,997 | 9/1980 | Hager | 364/900 |
| 4,258,418 | 3/1981 | Heath | 364/200 |
| 4,378,594 | 3/1983 | Kenyon | 364/900 |
| 4,433,394 | 2/1984 | Torii et al. | 365/221 |
| 4,592,019 | 5/1986 | Huange et al. | 365/78 |
| 4,616,338 | 10/1986 | Helen et al. | 364/900 |
| 4,694,426 | 9/1987 | Mason | 365/78 |

OTHER PUBLICATIONS

Pai, "FIFO RAM Controller Tackles Deep Data Buffering", Computer Design, Aug. 1, 1986, pp. 109–112.
Tunick, "Rich with Logic, Memory ICs Hone their Specialties", Electronic Design, Jun. 11, 1987, pp. 77–86.

Primary Examiner—Glenn A. Gossage
Attorney, Agent, or Firm—Robert C. Hogeboom

[57] ABSTRACT

A FIFO (first in first out) control circuit for providing address information to a FIFO memory uses two up counters—one to provide the write address and one to provide the read address. A multiplexer selects which addresses (read or write) are used. Two storage registers are used to temporarily "hold" the output from the counters. This enables the counters to be re-loaded with their original "count" to enable either a re-reading or a re-writing of a message stored in the FIFO memory. Comparators and logic circuitry are used to provide two status output signals, namely full (or not) and empty (or not).

8 Claims, 4 Drawing Sheets

MESSAGE FIFO BUFFER CONTROLLER

This invention relates generally to FIFO (First In First Out) memories, and more particularly to a control circuit for FIFO memories.

BACKGROUND OF THE INVENTION

FIFO memories are well known. One type of FIFO memory consists of a random access memory (RAM) associated with control circuitry. The control circuitry is used to control the writing of data into the RAM and the reading of data from the RAM.

Such FIFO systems are exemplified by the following U.S. patents to which attention is directed: U.S. Pat. No. 4,616,338 by A. Helen et al dated Oct. 7, 1986; U.S. Pat. No. 4,592,019 by A. Huang et al dated May 27, 1986; U.S. Pat. No. 4,433,394 by S. Torii et al dated Feb. 21, 1984; U.S. Pat. No. 4,163,291 by S. Suzuki et al dated July 31, 1979; and U.S. Pat. No. 3,601,809 by H. J. Gray et al dated Aug. 24, 1971.

Some drawbacks with those existing FIFO memories are that they don't operate in a message mode and they don't have the capability to re-read data from, or to re-write data to, a memory. Additionally, they employ up/down counters which ar relatively large and complex.

SUMMARY OF THE INVENTION

The present invention is not unlike those of the prior art in that it uses two counters, but it additionally employs an extra bit in each counter that when used with appropriate logic circuitry produces status (or control) signals for the FIFO; i.e. empty or full. The operation of the present invention is in a "message" mode. In one embodiment the operation of the present invention provides the capability of re-writing a section of memory and of rereading a section of memory. The present invention also does away with an up/down counter and its associated complexities.

Stated in other terms the present invention is a control circuit for a FIFO (first in first out) memory circuit for providing address information to a FIFO memory means having an address field of n bits, the control circuit comprising: a first means for providing a first binary signal having $n+1$ bits; a second means for providing a second binary signal having $n+1$ bits; a first storage means for selectively receiving and storing the output of the first means; second storage means for selectively receiving and storing the output of the second means; first comparator means for comparing the output of the first storage means with the output of the second means and producing a first control signal indicative of the comparison; and second comparator means for comparing the output of the second storage means with the output of the first means and producing a second control signal indicative of the comparison.

Stated in yet other terms, the present invention is a control circuit for a FIFO (first in first out) memory circuit for providing address information to a FIFO memory means having an address field of n bits, the control circuit comprising: first counter means for providing a first binary signal having $n+1$ bits; second counter means for providing a second binary signal having $n+1$ bits; multiplexer means for receiving both the first signal and the second signal and selecting either the first or second signal as its output; first storage means for selectively receiving and storing the output of the first counter means; second storage means for selectively receiving and storing the output of the second counter means; first bus means for applying the output of the first storage means to the first counter means; second bus means for applying the output of the second storage means to the second counter means; first comparator means for comparing the output of the first storage means with the output of the second counter means and producing a first control signal indicative of the comparison; and second comparator means for comparing the output of the second storage means with the output of the first counter means and producing a second control signal indicative of the comparison; whereby the n least significant bits output from the multiplexer, are used to address the FIFO memory.

BRIEF DESCRIPTION OF THE DRAWINGS

The invention will now be described in more detail with reference to the accompanying drawings wherein like parts in each of the several figures are identified by the same reference characters, and wherein.

DETAILED DESCRIPTION

Figure 1:
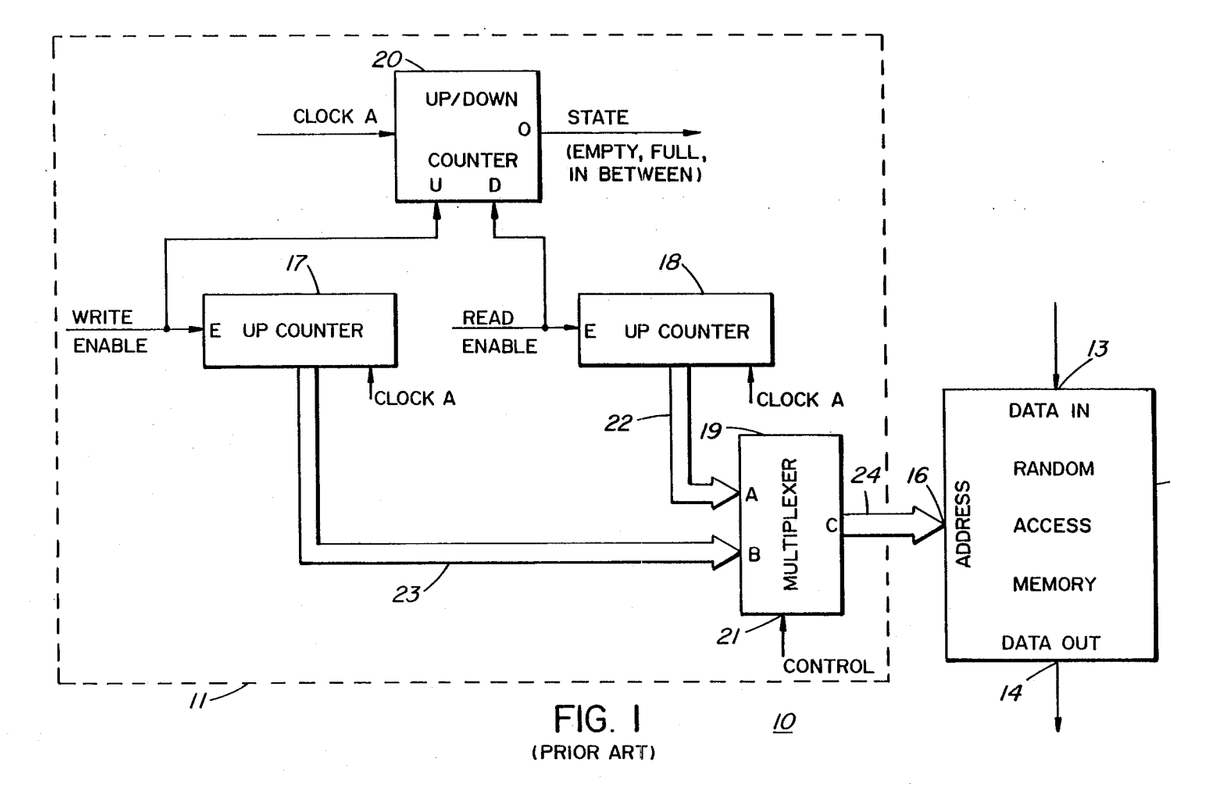
FIG. 1 is a simplified block diagram of a prior art FIFO memory.

FIG. 1 depicts, in simplified form, a FIFO memory circuit 10 constructed according to known techniques. Circuit 10 comprises a FIFO control circuit 11 and a FIFO memory 12. FIFO memory 12 is a random access memory (RAM) having a data input port 13, a data output port 14, and an address port 16.

FIFO control circuit 11 comprises up counter 17, up counter 18, multiplexer 19, and up/down counter 20, interconnected as shown in FIG. 1. Counters 17 and 18 are clocked by a clock signal A, as shown. Up counter 17 has a write enable input E as shown and up counter 18 has a read enable input E as shown. The output of counter 18, on bus 22, is applied to input port A of multiplexer 19; the output of counter 17, on bus 23, is applied to input port B of multiplexer 19. Output port C, of multiplexer 19, applies to bus 24 either the signal from input port A or input port B as selected by the control signal on control port 21. Note that up counter 17 is a model 74F163, up counter 18 is a model 74F163, multiplexer 19 is a model 74F157, and Up/Down counter 20 is a model 74F199.

Assume an initial state for FIFO memory Circuit 10 of no data stored in RAM 12 and counters 17 and 18 having a zero output and counter 20 indicating on its output 0 that RAM 12 is empty (i.e. output 0 is zero). Assume that data is to be stored in RAM 12. Data is applied sequentially to input port 13 of RAM 12 while an enable signal (i.e. a logic 1) is applied to the E input of counter 17. Counter 17 increases its count which is applied to multiplexer 19 via bus 23. The control signal applied to control input 21 of multiplexer 19 causes input port B of multiplexer 19 to be connected to output port C of multiplexer 19, and thus to bus 24 and then to address port 16 of RAM 12. Consequently, data applied to input port 13 is stored in sequential locations in RAM 12, the addresses of which are determined by counter 17.

Assume that all the data to be stored is now stored in RAM 12 and we now wish to retrieve all or some of it (i.e. read from RAM 12). A read enable signal (i.e. a logic 1) is applied to the E input of up counter 18. Counter 8 increases its count which is applied to multiplexer 19 via bus 22. The control signal applied to control input 21 of multiplexer 19 causes input port A of multiplexer 19 to be connected to output port C of multiplexer 19, and thus to bus 24 and then to address port 16 of RAM 12. Consequently, successive addresses are applied to RAM 12, and data stored in those addressed locations are applied in turn to data output port 14 of RAM 12.

Up/Down Counter 20 is used to keep track of the state of RAM 12; i.e. is RAM 12 full, empty, or somewhere in between. The write enable signal from input E of counter 17 is applied to the up input terminal U of counter 20 (a signal applied here causes counter 20 to increase its count i.e. count up). The read enable signal from input E of counter 18 is applied to the down input terminal D of counter 20 (a signal applied here causes counter 20 to decrease its count i.e. count down). Output terminal 0 of counter 20 carries a count (i.e. number) indicative of the state of RAM 12. In other words, if RAM 12 is empty then output 0 is zero; if RAM 12 is full then output 0 is FFF (hexadecimal) for this example; any number in between 0 and FFF (hex) indicates a measure of how full RAM 12 is. The larger the number, the fuller RAM 12 is.

This is of course a result of the fact that counter 20 started at zero when RAM 12 was empty. When data was stored in RAM 12 (as addressed by counter 17) counter 20 counted up; when data was retrieved (read) from RAM 12 (as addressed by counter 18) counter 20 counted down.

Figure 2:
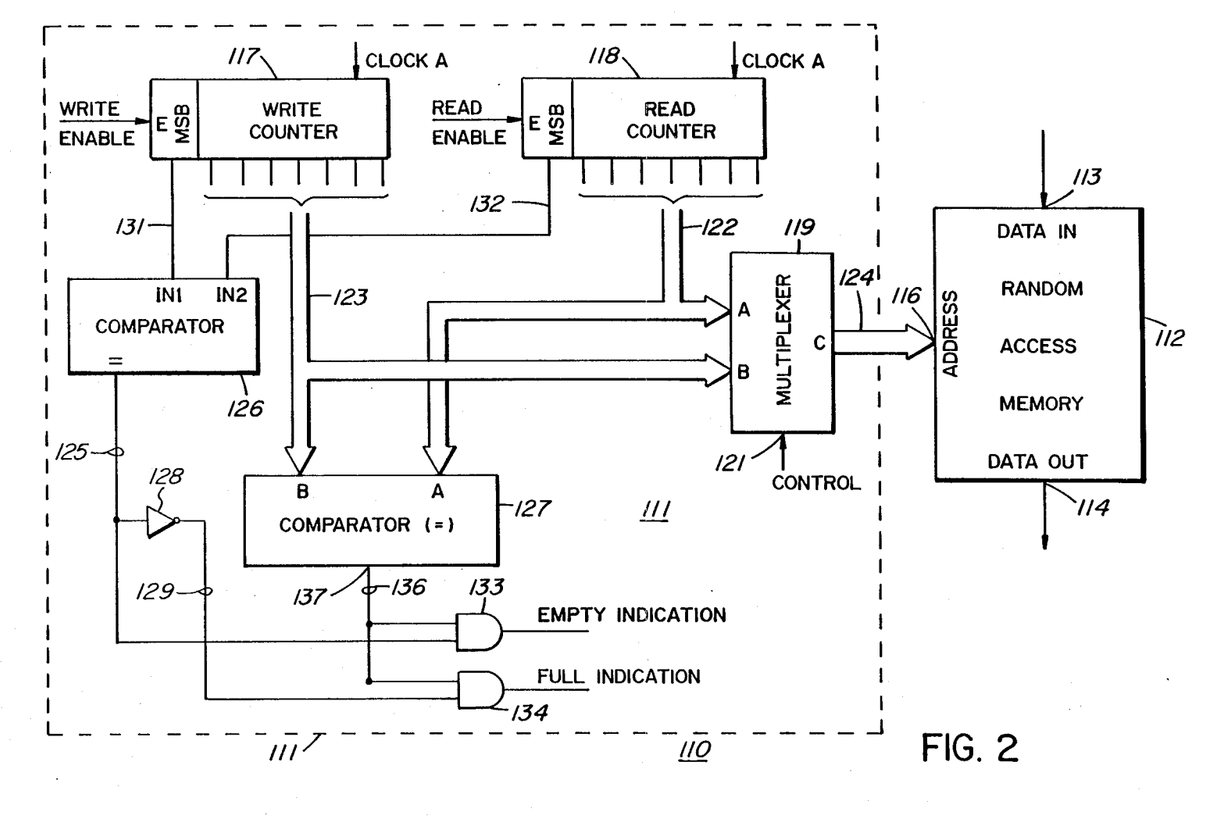
FIG. 2 is a simplified block diagram of a FIFO memory useful for understanding the operation of the present invention.

FIG. 2 depicts, in simplified form, a FIFO memory circuit 110. Circuit 110 comprises FIFO control circuit 111 and FIFO memory 112. FIFO memory 112 is a random access memory (RAM) having a data input port 113, a data output port 114, and an address port 116.

FIFO control circuit 111 comprises write counter 117 (e.g. an up counter, model 74F163), read counter 118 (e.g. an up counter, model 74F163), multiplexer 119, (model 74F157), comparator 126 (model 74688), and comparator 127, interconnected as depicted in FIG. 2.

Counters 117 and 118 are clocked by a clock signal A (4.096 MHz) as shown. Note that while counters 117 and 118 are depicted being clocked by a common clock A, they could be clocked by two different clocks. However, for ease of control (e.g. set-up time) is it preferred that counter 117 and 118 be clocked by two 180 degree out of phase signals from a common clock (e.g. A and $\overline{A}$). Write counter 117 has a write enable input E as shown and read counter 118 has a read enable input E as shown. The output of counter 117, less the most significant or overflow bit MSB, is applied to both input port A of multiplexer 119 and input port A of comparator 127, via bus 122. The output of counter 117, less the most significant or overflow bit MSB, is applied to both input port B of multiplexer 119 and input port B of comparator 127, via bus 123. Note that if n bits are required to address RAM 112, then counter 117 is an (n+1) bit counter and counter 118 is also an (n+1) bit counter.

Output port C, of multiplexer 119, applies to bus 124 either the signal from input port A or input port B as selected by the control signal on control port 121.

Note that the most significant bit MSB of counter 117 is applied to input IN1 of comparator 126 via lead 131; the most significant bit MSB of counter 118 is applied to input IN2 of comparator 126 via lead 132. Comparator 126 has an output labelled =. If the two inputs of comparator 126 are the same (i.e. both logic 0 or both logic 1) then output = (i.e. output signal 125) of comparator 126 is a logic 1. If the two inputs of comparator 126 are not the same, then the output = (i.e. output signal 125) of comparator 126 are logic 0. Output signal 125 is applied to inverter 128, the output of which is output signal 129.

The output signals 125 and 129 are applied to AND gates 133 and 134, respectively, as depicted in FIG. 2. The other input of AND gates 133 and 134 is output signal 136 from output port 137 of comparator 127, as depicted in FIG. 2. When the signal applied to input port A of comparator 127 is equal to the signal applied to input port B of comparator 127, output signal 136 at port 137 is a logic 1; otherwise, output signal 136 is a logic 0.

Assume an initial state for FIFO memory circuit 110 of no data stored in RAM 112 and counters 117 and 118 having a zero output. Consequently, the signals on leads 131 and 132 are the same (both logic 0) and the output of comparator 126 (i.e. signal 125) on output = is a logic 0. Likewise, the signals on buses 122 and 123 applied to the inputs A and B, respectively, of comparator 127 are identical and output signal 136 from comparator 127 is a logic 1 signal.

As a result, the output of AND gate 133, i.e. empty indication, is a logic 1 signal. The output of AND gate 134, i.e. full indication, is a logic 0 signal.

Assume that data is to be stored in RAM 112. Data is applied sequentially to input port 113 of RAM 112 while an enable signal (i.e. a logic 1) is applied to the E input of counter 117. Counter 117 increases its count which is applied to multiplexer 119 via bus 123. The control signal applied to control input 121 of multiplexer 119 causes input port B of multiplexer 119 to be connected to output port C of multiplexer 119, and thus to bus 124 and then to address port 116 of RAM 112. Consequently, data applied to input port 113 is stored in sequential locations in RAM 112, the addresses of which are determined by counter 117.

As counter 117 increases its count, the signal on bus 123 will no longer be equal to the signal on bus 122 and consequently output signal 136 from comparator 127 changes to a logic 0 signal. This has the result that the output of AND gate 133 becomes a logic 0 signal, and the output of AND gate 134 remains at a logic 0 signal. Note that the output of comparator 126 has not yet changed.

Suppose that RAM 112 is only partially filled (e.g. 1K) when counter 117 is stopped and counter 118 is enabled to begin reading data from RAM 112. The output states of AND gates 133 and 134 remain unchanged (i.e. at logic 0 and 0 respectively) until the output of counter 118 equals the contents of counter 117. At that point in time, output signal 136 from comparator 127 becomes a logic 1 and consequently the output of AND gate 133 is a logic 1 and the output of AND gate 134 remains a logic 0. This indicates that RAM 112 is empty because everything that has been stored in RAM 112 (i.e. under the control of counter 117) has been retrieved from RAM 112 (i.e. under the control of counter 118).

Suppose now that more data is to be stored in RAM 112. As before, data is applied sequentially to input port 113 of RAM 112 while an enable signal (i.e. a logic 1) is applied to the E input of counter 117. Counter 117 increases its count which is applied to multiplexer 119 via bus 123. The control signal applied to control input 121 of multiplexer 119 causes input port B of multiplexer 119 to be connected to output port C of multiplexer 119, and thus to bus 124 and then to address port 116 of RAM 112. Consequently, data applied to input port 113 is stored in sequential locations in RAM 112, the addresses of which are determined by counter 117.

As counter 117 increases its count, the signal on bus 123 will no longer be equal to the signal on bus 122 and consequently output signal 136 from comparator 127 changes to a logic 0 signal. This has the result that the output of AND gate 133 becomes a logic 0 signal, and the output of AND gate 134 remains at a logic 0 signal. This indicates that RAM 112 is neither empty nor full. Note that the output of comparator 126 has not yet changed.

Suppose that counter 117 continues to increase its count and gets to the situation where its MSB is a logic 0 and its remaining bits are all logic 1's. In other words, bus 123 is carrying the highest possible address for RAM 112 (recall that counter 117 has one extra bit beyond that required to address RAM 112; i.e. if n bits are required to address RAM 112, then counter 117 has n+1 bits). At the next clock pulse, counter 117 changes to a logic 1 in its most significant bit MSB and the remainder of its bits are all logic 0.

This results in output signal 136 of comparator 127 remaining at logic 0 (i.e. The inputs on its ports A and B are not equal) and the output of comparator 126 changing to become a logic 0. This means that AND gate 133 has logic 0 at both of its inputs (with consequently a logic 0 at its output) and AND gate 134 has both a logic 0 and a logic 1 at its two inputs (with consequently a logic 0 at its output). The outputs of AND gates 133 and 134 thus continue to indicate that RAM 112 is neither full nor empty.

As counter 117 continues to increase its count, it gets to the situation where its output on bus 123 equals the output of counter 118 on bus 122. At that point in time, output signal 136 from comparator 127 becomes a logic 1. This results in the output of AND gate 133 remaining at a logic 0 and the output of AND gate 134 becomes a logic 1 (since both of its inputs are now logic 1) indicating that RAM 112 is now full.

Figure 3:
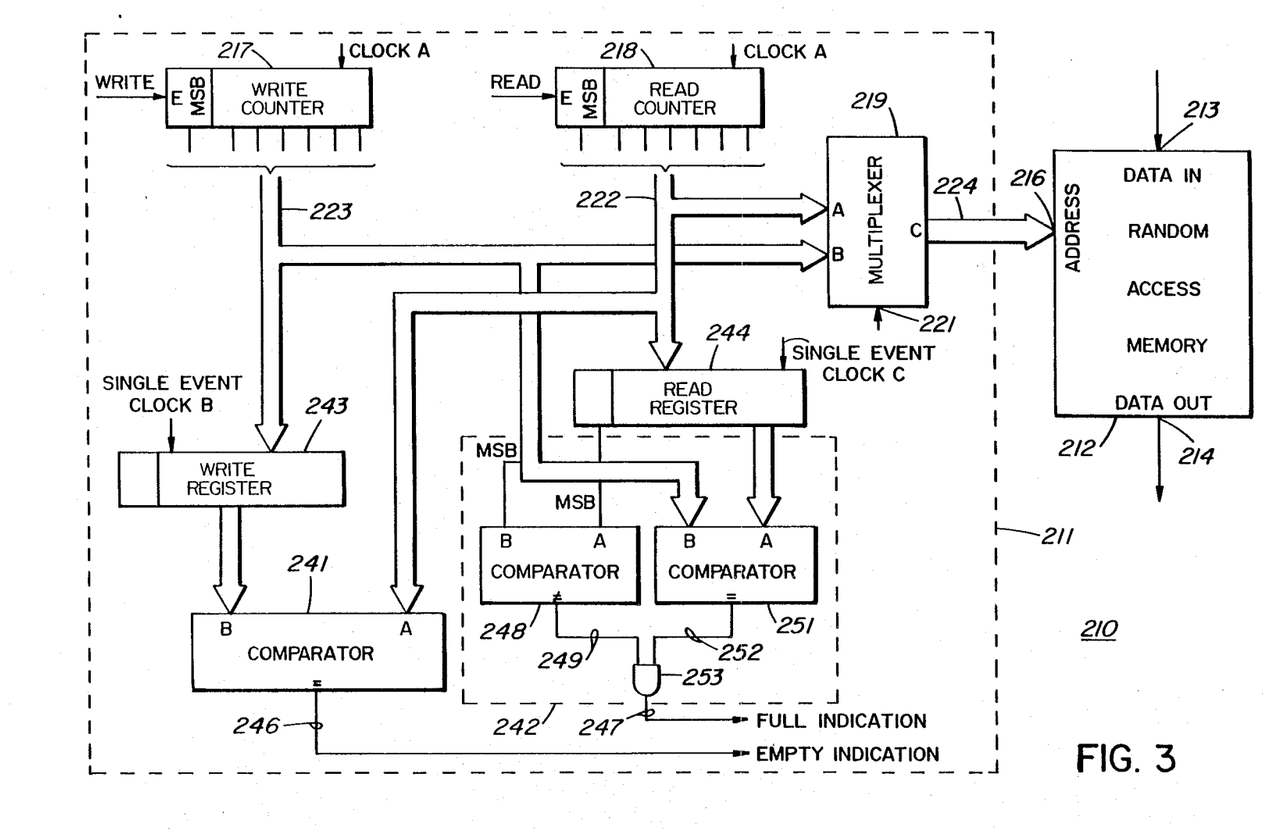
FIG. 3 is a simplified block diagram of one embodiment of a FIFO memory constructed according to the present invention.

FIG. 3 depicts, in simplified form, FIFO memory circuit 210 constructed according to the present invention. Circuit 210 comprises FIFO control circuit 211 and FIFO memory 212. FIFO memory 212 is a random access memory (RAM) having a data input port 213, a data output port 214, and an address port 216.

FIFO control circuit 211 comprises write counter 217 (e.g. an up counter, model 74F163), read counter 218 (e.g. an up counter, model 74F163), multiplexer 219 (model 74F157), comparator 241 (model 74688), comparator 248 (model 74688), comparator 251 (model 74688) write register 243, and read register 244, all interconnected as depicted in FIG. 3.

Counters 217 and 218 are clocked by clock signal A, as shown. Write counter 217 has a write enable input E as shown and read counter 218 has a read enable input E as shown. The output of counter 218, including the most significant or overflow bit MSB, is applied to input port A of multiplexer 219, to register 244, and to input port A of comparator 241, via bus 222 (note that the MSB is not required by multiplexer 219 or RAM 212). The output of counter 217, including the most significant or overflow bit MSB, is applied to input port B of multiplexer 219, register 243, and to input port B of comparator 242, via bus 223 (note that the MSB is not required by multiplexer 219 or RAM 212).

Output port C, of multiplexer 219, applies to bus 224 either the signal from input port A or input port B as selected by the control signal on control port 221.

Note that registers 243 and 244 are clocked by single event clock B and single event clock C, respectively. Single event clock B is a pulse that occurs when write counter 217 has stopped increasing (i.e. writing is finished) and the final count attained by counter 217 is to be stored in write register 243. Single event clock C is a pulse that occurs when read counter 218 has stopped increasing (i.e. reading is finished) and the final count attained by counter 218 is to be stored in read register 244.

Note that FIFO memory circuit 210 of FIG. 3 operates in a "message" mode. That is, due to the fact that the values stored in registers 243 and 244 are not updated until the writing or reading, respectively, are completed, multi-increments are required before a status change (i.e. full or empty) is reflected on the indicators. In other words, a complete "message" must be written or read before a change of status occurs.

One comparison in the FIG. 3 embodiment is done between write counter 217 and read register 244, via comparator 242, to indicate the full condition; another comparison is done between read counter 218 and write register 243, via comparator 241, to indicate the empty condition.

In more detail, the contents of write register 243 are applied to the B input of comparator 241 while the output of read counter 218 is applied to the A input of comparator 241. If the signals at the A and B inputs of comparator 241 are both the same (i.e. equal) output signal 246, from comparator 241, is a logic 1 signal; otherwise it is a logic 0 signal.

In a similar manner, the contents of read register 244 are applied to the A inputs of comparators 251 and 248 while the output of write counter 217 is applied to the B inputs of comparators 251 and 248, as depicted in FIG. 3. Note that comparator 248 compares the most significant bits (MSB) while comparator 251 compares the remaining bits of each signal.

If the signals at the A and B inputs of comparator 248 are equal, then output signal 249 from comparator 248 is a logic 0 signal; otherwise it is a logic 1 signal. If the signals at the A and B inputs of comparator 251 are equal, then output signal 252 from the =output of comparator 251 is a logic 1 signal; otherwise, it is a logic 0 signal.

Signals 249 and 252 are applied to AND gate 253 as shown; the output of AND gate 253 is signal 247 as depicted in FIG. 3 (this is of course also the output of comparator 242).

Assume an initial state for FIFO memory circuit 210 of no data stored in RAM 212 and counters 217 and 218 each having a zero output, and registers 243 and 244 each having their contents equal to zero. Consequently, the signals on inputs A and B of comparator 241 are the same (both are all logic 0's) and output signal 246 from comparator 241 is a logic 1 signal (indicating empty).

Likewise, the signals on inputs A and B of comparator 248 are the same (both are logic 0's) and the signals on inputs A and B of comparator 251 are the same (all logic 0's); consequently output signal 249 from comparator 248 is a logic 0 signal and output signal 252 from comparator 251 is a logic 1 signal. As a result, output signal 247 from comparator 242 is a logic 0 signal (indicating not full).

Assume that data is to be stored in RAM 212. Data is applied sequentially to input port 213 of RAM 212 while an enable signal (i.e. a logic 1) is applied to the E input of counter 217. Counter 217 increases its count which is applied to multiplexer 219 via bus 223. The control signal applied to control input 221 of multiplexer 219 causes input port B of multiplexer 219 to be connected to output port C of multiplexer 219, and thus to bus 224 and thence to address port 216 of RAM 212. Consequently, data applied to input port 213 is stored in sequential locations in RAM 212, the addresses of which are determined by counter 217.

As counter 217 increases its count, the signal on the B input of comparator 251 will no longer equal the signal on the A input of comparator 251. Until the count gets very high (i.e. until the most significant bit becomes a logic 1) output signal 249 from comparator 248 remains a logic 0 and output signal 252 from comparator 251 becomes a logic 0 (since the signals on the A and B inputs of comparator 251 will differ once counter 217 starts to count). As a result, AND gate 253 has two logic 0 signals for inputs and output signal 247 remains a logic 0 indicating not full.

While this is happening, counter 218 is still at zero and register 243 is also still at zero. Consequently, the signals applied to the A and B inputs of comparator 241 have not changed and are still equal (i.e. both are all zeroes). As a result, output signal 246 remains a logic 1 signal, indicating empty.

Suppose that RAM 212 is only partially filled (e.g. 1K) when counter 217 is stopped. At that point in time register 243 is clocked by single event clock B and the signal on bus 223 (i.e. The count reached by counter 217) is stored in register 243. When this happens, the A and B inputs of comparator 241 no longer carry equal signals and output signal 246 from comparator 241 becomes a logic 0 signal, indicating not empty. Output signal 247 from comparator 242 remains unchanged at a logic 0 indicating not full.

Now assume that counter 218 is enabled to begin reading data from RAM 212. Output signal 277 does not change because the input signals to comparator 242 have not yet changed. Output signal 246 remains unchanged (at logic 0) until the output of counter 218 equals the contents of latch 243. At that point in time, the two inputs to comparator 241 are equal and output signal 246 becomes a logic 1 signal indicating that RAM 212 is empty.

At the time that counter 218 is stopped, register 44 is clocked by single event clock C and the signal on bus 22 (i.e. The count reached by counter 218) is stored in register 244. When this happens, the A and B inputs of comparator 251 carry equal signals and output signal 247 from comparator 242 remains a logic 0 indicating not full.

Suppose now that more data is to be stored in RAM 212. As before, data is applied sequentially to input port 213 of RAM 212 while an enable signal (i.e. a logic 1) is applied to the E input of counter 217. Counter 217 increases its count which is applied to multiplexer 219 via bus 223. The control signal applied to control input 221 of multiplexer 219 causes input port B of multiplexer 219 to be connected to output port C of multiplexer 219, and thus to bus 224 and then to address port 216 of RAM 212. Consequently, data applied to input port 213 is stored in sequential locations in RAM 212, the addresses of which are determined by counter 217.

As counter 217 increases its count, the signals applied to comparator 241 do not change (yet) and output signal 246 remains a logic 1 indicating that RAM 212 is empty.

As counter 217 increases its count, the signal applied to the B input of comparator 251 is changing. The signal applied to the A input of comparator 252 remains the same (i.e. The contents of register 244). As a result, output signal 247 is a logic 0 signal indicating not full.

Suppose that counter 217 continues to increase its count and gets to the situation where its MSB is a logic 0 and its remaining bits are all logic 1's. In other words, bus 223 is carrying the highest possible address for RAM 212 (recall that counter 217 has one extra bit beyond that required to address RAM 212; i.e. if n bits are required to address RAM 212, then counter 217 has n+1 bits). At the next clock pulse, counter 217 changes to a logic 1 in its most significant bit MSB and the remainder of its bits are all logic 0.

This results in the B and A inputs of comparator 248 being logic 1 and logic 0, respectively. Consequently, output signal 249 from comparator 248 is a logic 1 signal. The B input of comparator 251 is all logic 0's and the A input is 1K in binary. Consequently, output signal 252 from comparator 251 is a logic 0 signal (unequal inputs). This means that the inputs at AND gate 253 are a logic 1 and a logic 0 with the result that output signal 247 is a logic 0 indicating not full.

As counter 217 continues to increase its count, the signal applied to input B of comparator 251 (i.e. the output of counter 217 less the most significant bit) will eventually equal the signal applied to input A of comparator 251 (i.e. the output of latch 244 less the most significant bit). When this happens, output signal 252 from comparator 251 becomes a logic 1 signal (inputs equal). Output signal 249 from comparator 248 remains a logic 1 signal and output signal 247 from AND gate 253 becomes a logic 1 signal indicating that RAM 212 is full. Note that signal 246 from comparator 241 is still a logic 0 indicating RAM 212 is not empty.

When signal 247 becomes a logic 1, indicating that RAM 212 is full, counter 217 stops increasing its count. Register 243 is clocked by single event clock B with the result that the contents of counter 217 are stored in register 243. This has the result that input B of comparator 241 now has a new value. The value at input B of comparator 241 is the same as the value at input A except for the most significant bit; the value at input B has a logic 1 for its most significant bit and the value at input A has a logic 0 for its most significant bit. Consequently, the inputs for comparator 241 are not equal and output signal 246 is a logic 0 indicating not empty.

Because RAM 212 is now full (signal 246 is a logic 0 and signal 247 is a logic 1) no more data can be written to RAM 212; data can only be read, as the next step.

Assume now that counter 218 is enabled to begin reading data from RAM 212. Output signal 247 does not change immediately because the input signals to comparator 242 have not yet changed (i.e. signal 247 remains a logic 1 indicating a full condition). Output signal 246 remains unchanged (at logic 0) until the output of counter 218 equals the contents of register 243. At that point in time, the two inputs to comparator 241 are equal and output signal 246 becomes a logic 1 signal indicating that RAM 212 is empty.

At that time (i.e. when signal 246 becomes a logic 1) counter 218 is stopped, register 244 is clocked by single event clock C and the signal on bus 222 (i.e. the count reached by counter 218) is stored in register 244. When this happens, the A and B inputs of comparators 248 and 251 carry equal signals and output signal 247 becomes a logic 0 indicating not full.

A circuit operated in the mode of the FIG. 3 embodiment has the advantages that it is message oriented and therefore allows relatively smooth transfer of data that is message oriented.

Figure 4:
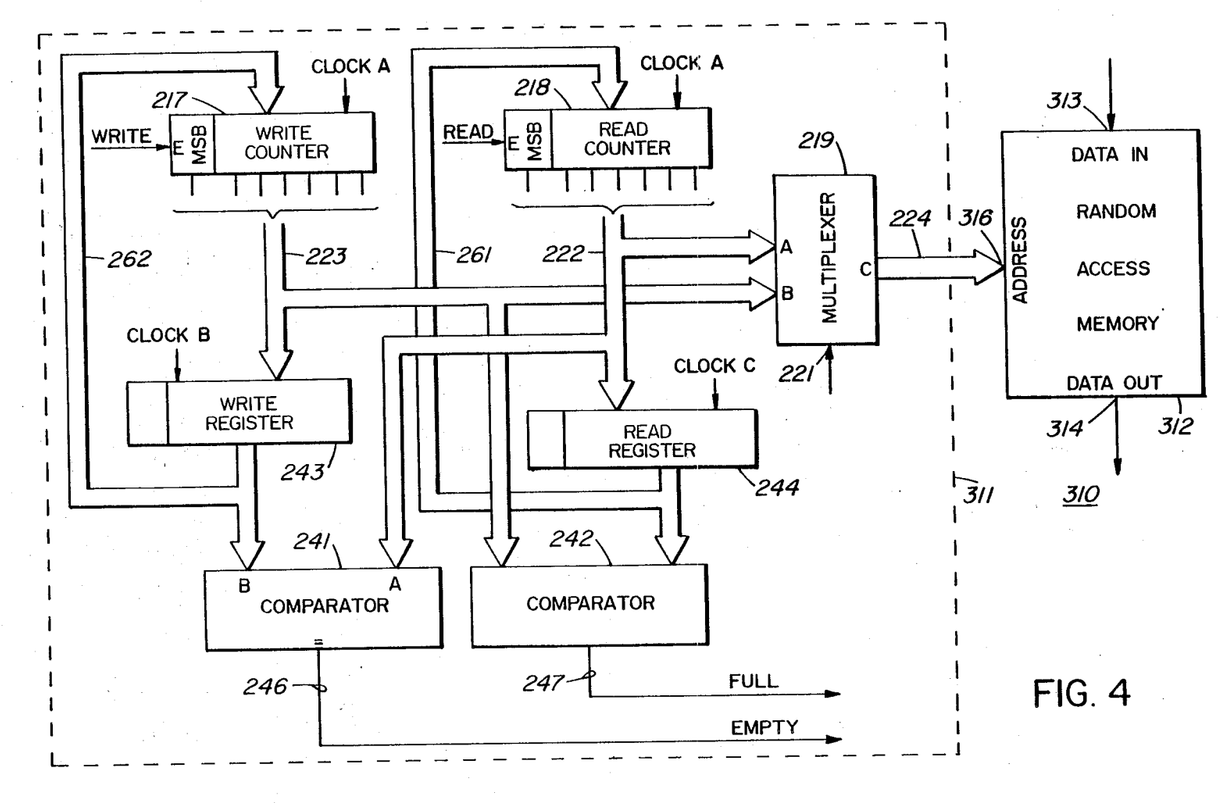
FIG. 4 is a simplified block diagram of one preferred embodiment of a FIFO memory constructed according to the present invention.

FIG. 4 depicts, in simplified form, one preferred embodiment of a FIFO memory circuit 310 constructed according to the present invention. The embodiment of FIG. 4 is similar to that depicted in FIG. 3, but has the addition of bus 261 between register 244 and counter 218 and of bus 262 between register 243 and counter 217.

The addition of buses 261 and 262 adds feedback between registers 243 and 244 and their corresponding counters 217 and 218, respectively, permits more control on the contents of FIFO memory 212.

By reloading write counter 217 from write register 243, the message just stored (written) in FIFO memory 212 can be erased. This occurs because register 243 contains the starting count of counter 217 and register 243 does not store the final count of counter 217 until clocked by single event clock B. Consequently, by not providing the single event clock B signal, register 243 contains the starting count of counter 217; this count can then be inserted into counter 217 via bus 262. As a result, when counter 217 starts counting again, it will be starting at its earlier count and data now being stored in FIFO memory 212 will overwrite data that had already been stored there.

Similarly, by reloading read counter 218 from read register 244, the message just read from FIFO memory 212 can be kept for re-reading. This occurs because register 244 contains the starting count of counter 218 and register 244 does not store the final count of counter 218 until clocked by single event clock C. Consequently, by not providing the single event clock C signal, register 244 contains the starting count of counter 218; this count can then be inserted into counter 218 via bus 261. As a result, when counter 218 starts counting again, it will be starting at its earlier count and data now being read (addressed) from FIFO memory 212 will be data that has already been read from memory 212.

In a typical application, after writing one message (via write counter 217) write register 243 is updated with the contents of write counter 217, thus "accepting" the message. If the controller (not shown) writing the message detects an integrity problem (e.g. parity) reloading write counter 217 with the contents of write register 243 "rejects" that message.

In a read operation, read register 244 is normally updated from read counter 218, thus "purging" the message stored in FIFO memory 212. If, however, the receive controller (not shown) indicates an integrity problem (e.g. parity) it can reload counter 218 with the contents of read register 244 to "keep" the message in memory 212 for a retry (retransmission).

There are some built-in interlocks between the two indicators (i.e. empty indicator or signal 246; and full indicator or signal 247) and counters 217 and 218 to prevent write counter 217 from incrementing when FIFO memory 212 is full and to thereby prevent overwriting. In fact, in that case, an auto-reject of the portion of the message will take place at the end of that message. Also, read counter 218 is prevented from incrementing if FIFO memory 212 is empty, thereby avoiding erroneous full indications. These features have not been shown in the Figures in order not to obfuscate the description of the present invention.

What is claimed is:

1. A control circuit for a FIFO (first in first out) memory circuit for providing address information to a FIFO memory means having an address field of n bits, said control circuit comprising:
   a first means for providing a first binary signal having n+1 bits;
   a second means for providing a second binary signal having n+1 bits;
   a first storage means for selectively receiving and storing the output of said first means;
   second storage means for selectively receiving and storing the output of said second means;
   first comparator means for comparing the output of said first storage means with the output of said second means and producing a first control signal indicative of said comparison; and
   second comparator means for comparing the output of said second storage means with the output of said first means and producing a second control signal indicative of said comparison.

2. The control circuit of claim 1 wherein said first means is a counter means and wherein said second means is a counter means.

3. The control circuit of claim 2 further including a multiplexer means for receiving both said first signal and said second signal and selecting either said first or said second signal as its output whereby the n least significant bits output from said multiplexer are used to address said FIFO memory.

4. The control circuit of claim 1, 2, or 3 wherein said second comparator comprises:
   third comparator means for comparing the most significant bit of said first signal with the most significant bit of the output from said second storage means and producing a third control signal indicative of said comparison;
   fourth comparator means for comparing the n least significant bits of said first signal with the n least significant bits from said second storage means and producing a fourth control signal indicative of said comparison;
   logic means, responsive to said third control signal and said fourth control signal, to produce said second control signal indicative of said memory circuit being full or not full.

5. A control circuit for a FIFO (first in first out) memory circuit for producing address information to a FIFO memory means having an address field of n bits, said control device comprising:
   first counter means for providing a first binary signal having n+1 bits;
   second counter means for providing a second binary signal having n+1 bits;
   multiplexer means for receiving both said first signal and said second signal and selecting either said first or second signal as its output;
   first storage means for selectively receiving and storing the output of said first counter means;

second storage means for selectively receiving and storing the output of said second counter means;

first bus means for applying the output of sid first storage means to said first counter means;

second bus means for applying the output of said second storage means to said second counter means;

first comparator means for comparing the output of said first storage means with the output of said second counter means and producing a first control signal indicative of said comparison; and second comparator means for comparing the output of said second storage means with the output of said first counter means and producing a second control signal indicative of said comparison;

whereby the n least significant bits output from said multiplexer are used to address said FIFO memory.

6. The control circuit of claim 5 wherein said first storage means is a binary storage register and wherein said second storage means is a binary storage register.

7. The control circuit of claim 6 wherein said second comparator comprises:
third comparator means for comparing the most significant bit of said first signal with the most significant bit of the output from said second storage means and producing a third control signal indicative of said comparison;
fourth comparator means for comparing the n least significant bits of said first signal with the n least significant bits from said second storage and producing a fourth control signal indicative of said comparison; and
logic means, responsive to said third control signal and said fourth control signal, to produce said second control signal indicative of said memory circuit being full or not full.

8. The control circuit of claim 7 wherein said logic means is an AND gate.

* * * * *